United States Patent
Modai et al.

(10) Patent No.: US 10,630,733 B2
(45) Date of Patent: Apr. 21, 2020

(54) GENERATING RECORDING ACCESS PERMISSIONS BASED ON MEETING PROPERTIES

(71) Applicant: Avaya Inc., Basking Ridge, NJ (US)

(72) Inventors: Ori Modai, Ramat Hasharon (IL); Eitan Bremler, Zoran (IL); Vincent Chavy, Merrimack, NH (US); David Bundy, Bedford, NH (US)

(73) Assignee: Avaya, Inc., Basking Ridge, NJ (US)

(*) Notice: Subject to any disclaimer, the term of this patent is extended or adjusted under 35 U.S.C. 154(b) by 530 days.

(21) Appl. No.: 14/657,039

(22) Filed: Mar. 13, 2015

(65) Prior Publication Data

US 2016/0269449 A1 Sep. 15, 2016

(51) Int. Cl.
*H04L 29/06* (2006.01)
*H04L 12/18* (2006.01)

(52) U.S. Cl.
CPC ...... *H04L 65/1083* (2013.01); *H04L 12/1818* (2013.01); *H04L 12/1822* (2013.01); *H04L 65/4038* (2013.01)

(58) Field of Classification Search
None
See application file for complete search history.

(56) References Cited

U.S. PATENT DOCUMENTS

| | | | | |
|---|---|---|---|---|
| 2005/0055306 A1* | 3/2005 | Miller | ............. | G06Q 10/10 705/37 |
| 2006/0235851 A1* | 10/2006 | Akachi | ............. | H04N 7/15 |
| 2007/0005691 A1* | 1/2007 | Pushparaj | ......... | H04M 3/42221 709/204 |
| 2010/0189260 A1* | 7/2010 | Ramanathan | ......... | G06F 21/10 380/259 |
| 2010/0228825 A1* | 9/2010 | Hegde | ............. | G06F 21/6218 709/204 |
| 2011/0287748 A1* | 11/2011 | Angel | ............. | H04M 3/42221 455/414.1 |
| 2012/0166534 A1* | 6/2012 | Bentley | ............. | H04L 12/1822 709/204 |
| 2012/0179502 A1* | 7/2012 | Farooq | ............. | G06Q 10/06311 705/7.13 |
| 2013/0145284 A1* | 6/2013 | Anantharaman | ... | H04L 12/1822 715/753 |
| 2014/0152757 A1* | 6/2014 | Malegaonkar | ......... | H04N 7/147 348/14.01 |

* cited by examiner

*Primary Examiner* — Nicholas R Taylor
*Assistant Examiner* — Christopher B Robinson

(57) ABSTRACT

Disclosed herein are systems, methods, and software to generate automated meeting permissions based on properties associated with a meeting. In an implementation, a method of operating a meeting publishing system to generate meeting publishing permissions includes identifying a request to record a meeting between a plurality of participants. The method further includes determining meeting properties associated with the meeting, generating permission for accessing a recording of the meeting based on the meeting properties, and initiation a recording system to provide the recording of the meeting based on the permissions.

18 Claims, 9 Drawing Sheets

| DATA STRUCTURE 600 | | | | | |
|---|---|---|---|---|---|
| MEETING PROPERTIES 610 | MEMBER 620 | MEMBER 621 | MEMBER 622 | MEMBER 623 | |
| PROPERTY 611 | MEMBER | MEMBER | MEMBER | MEMBER | |
| PROPERTY 612 | MEMBER | MEMBER | MEMBER | | |
| PROPERTY 613 | MEMBER | MEMBER | MEMBER | | |
| .... | .... | .... | .... | .... | |
| PROPERTY 614 | MEMBER | MEMBER | | | |

FIGURE 6

GENERATING RECORDING ACCESS PERMISSIONS BASED ON MEETING PROPERTIES

TECHNICAL BACKGROUND

Conferencing systems allow participants at a plurality of client devices to contribute information to a meeting without the users being in the same physical location. These systems may facilitate audio communications, video communications, or both, and may further allow a participant to schedule the meeting, attach files or documents to the meeting, or any other similar meeting operation. In some examples, the conferencing system may receive media streams from each of the client devices, compile the media streams into an output media stream, and provide the output stream back to the client devices.

Although a conferencing system may be useful for the real-time communication of ideas between invited parties, in some examples, a recording of the meeting may be useful to review the content of the meeting or provide the meeting information to parties that were not invited, or were otherwise not able, to participate in the live meeting. For example, if a meeting involved safety procedures within an organization, it may be beneficial for all relevant persons within the organization to review the safety contents of the meeting. However, organizing permissions and attributes for accessing a meeting recording may be cumbersome and inefficient for the party responsible for organizing the meeting.

OVERVIEW

Embodiments disclosed herein provide systems, methods, and computer readable media for generating meeting recording permissions based on attributes associated with the meeting. In one example, a computer readable storage medium having instructions stored thereon that, when executed by a meeting publishing system, direct the meeting publishing system to perform a method of generating meeting publishing permissions. The method includes identifying a request to record a meeting between a plurality of participants and, in response to identifying the request, determining meeting properties associated with the meeting. The method further provides generating permissions for accessing a recording of the meeting based on the meeting properties, and initiating a recording system to provide the recording of the meeting based on the permissions.

In another example, a method of operating a meeting publishing system to generate meeting publishing permissions includes identifying a request to record a meeting between a plurality of participants and, in response to identifying the request, determining meeting properties associated with the meeting. The method further provides generating permissions for accessing a recording of the meeting based on the meeting properties, and initiating a recording system to provide the recording of the meeting based on the permissions.

In another instance, a meeting publishing system to generate meeting publishing permissions includes a communication interface configured to receive a request to record a meeting between a plurality of participants. The meeting publishing system further includes a processing system configured to, in response to identifying the request, determine meeting properties associated with the meeting. The processing system is further configured to generate permissions for accessing a recording of the meeting based on the meeting properties, and initiate a recording system to provide the recording of the meeting based on the permissions.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates a data structure for determining recording permissions based on meeting properties.

DETAILED DESCRIPTION

Figure 1:
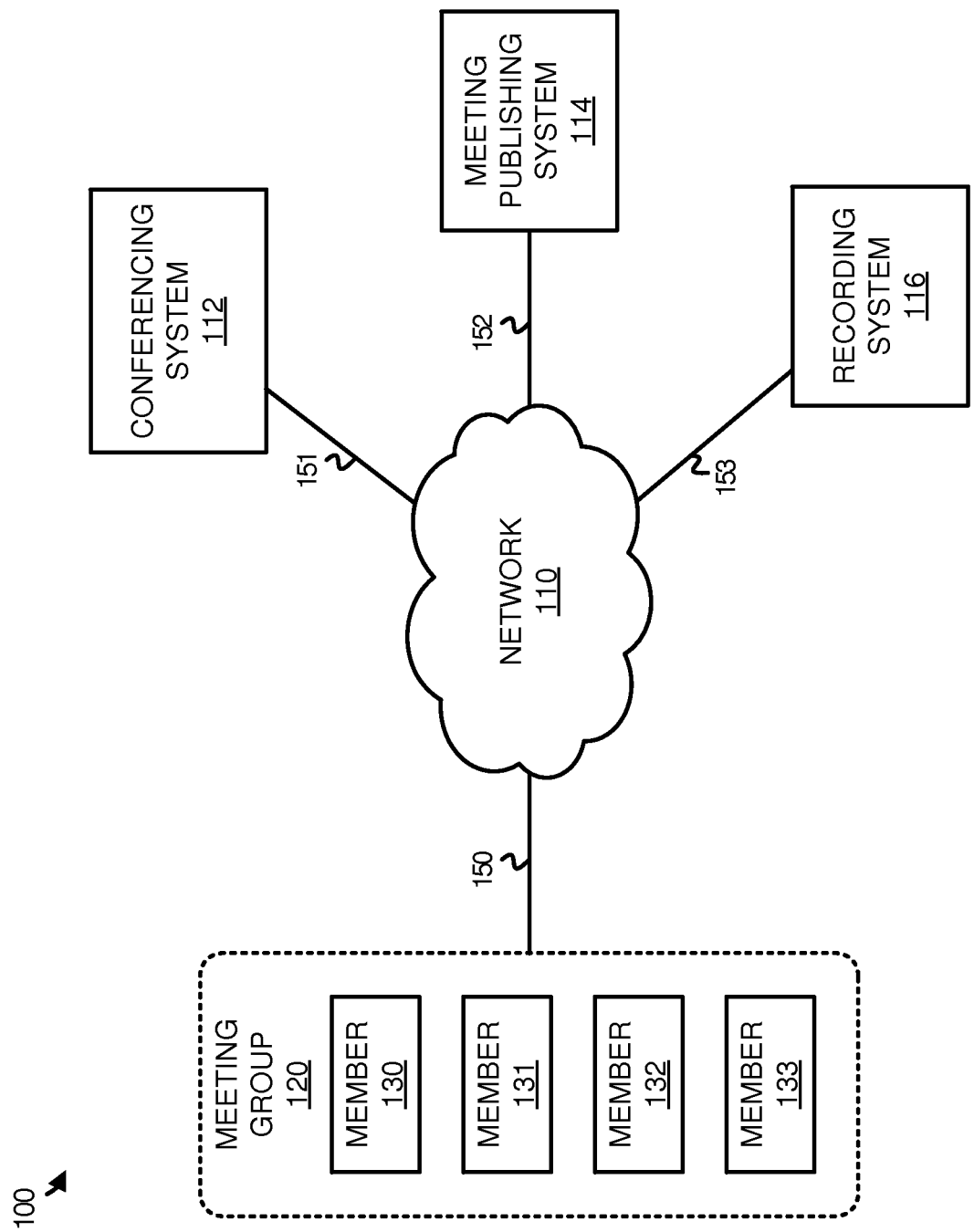
FIG. 1 illustrates a system to manage meeting recording permissions based on properties associated with the meeting.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various examples disclosed herein provide for generating meeting publishing permissions based on properties associated with the meeting. In many organizations, meetings are required for a plurality of participants to exchange a variety of information. These meetings, often managed by conferencing systems, allow participants to communicate with one another via a plurality of communication devices in a plurality of physical locations. The conferencing system may allow a participant to invite other participants to the meeting, provide a centralized service for handling the interactions within the meeting, provide a centralized location to attach files or documents, and provide a variety of other services related to the meeting. For example, a first participant may, via a conferencing system, invite a plurality of other participants to a meeting. Responsive to the request, the participants may join the conference using one or more client devices, or join the first participant in a physical location for the meeting.

Here, in addition to the systems that provide the meeting, a meeting publishing system is provided that identifies permissions for recording the meeting based on properties corresponding to the meeting. These meeting properties may include the participants involved in the meeting, the topic of the meeting defined by creator of the meeting, instant messaging text transcripts for the meeting, voice dictation transcripts for the meeting generated by voice dictation software, files attached or made available during the meeting, or other similar meeting properties. Once the properties are determined, various persons may be identified that should have access to a recording of the meeting. For instance, a meeting about safety within the workplace could generate access permissions for employees that work in the workplace even if they were not original invitees to the meeting. After the permissions are identified, the permissions may be transferred to a recording system to generate the meeting. In some examples, the permissions may be used to define directories and titles for each of the meeting recordings. Thus, the permitted personnel associated with the meeting may access the meeting in relevant storage locations based on the properties of the meeting. These directories and titles may comprise logical database partitions, such as categories or any other similar classification for the meetings and other related data.

Turning to FIG. 1, FIG. 1 illustrates a system 100 to manage meeting recording permissions based on properties associated with the meeting. System 100 includes network 110, conferencing system 112, meeting publishing system 114, recording system 116, and meeting group 120. Meeting group 120 includes members 130-133, which correspond to personnel with permission to access a recording of a particular meeting. Members 130-133 may access the recording of the meeting via one or more end user devices, such as computing systems, tablets, smartphones, and the like in one or more physical locations. Network 110 provides communication services to a plurality of systems and devices, and communicates with meeting group 120, conferencing system 112, meeting publishing system 114, and recording system 116 via communication links 150-153. Conferencing system 112, meeting publishing system 114, and recording system 116 may each comprise one or more physical or virtual computing systems capable of providing the meeting recording operations described herein.

In particular, conferencing system 112 identifies a meeting between multiple participants and notifies meeting publishing system 114 that a recording of the meeting is desired. Conferencing system 112 may provide the meeting participants with the ability to invite other participants to the meeting via email, text, or some other similar form of communication, identify a topic for the meeting, and identify a time and location for the meeting, amongst a variety of other meeting configuration parameters. Once the meeting is configured and the notification is delivered to meeting publishing system 114, meeting publishing system 114 may identify permissions for personnel to access the recorded meeting based on properties associated with the meeting. In response to determining the permissions, meeting publishing system 114 initiates recording system 116 to provide a recording of the meeting based on the identified permissions. Recording system 116 may record video, voice, and text communications for the meeting, as well as manage files transferred between parties during the meeting. In some examples, recording system 116 may communicate with conferencing system 112 to make the meeting recording, however, it should be understood that recording system 116 might also communicate with one or more of the client devices involved in the meeting to make the recording.

Figure 2:
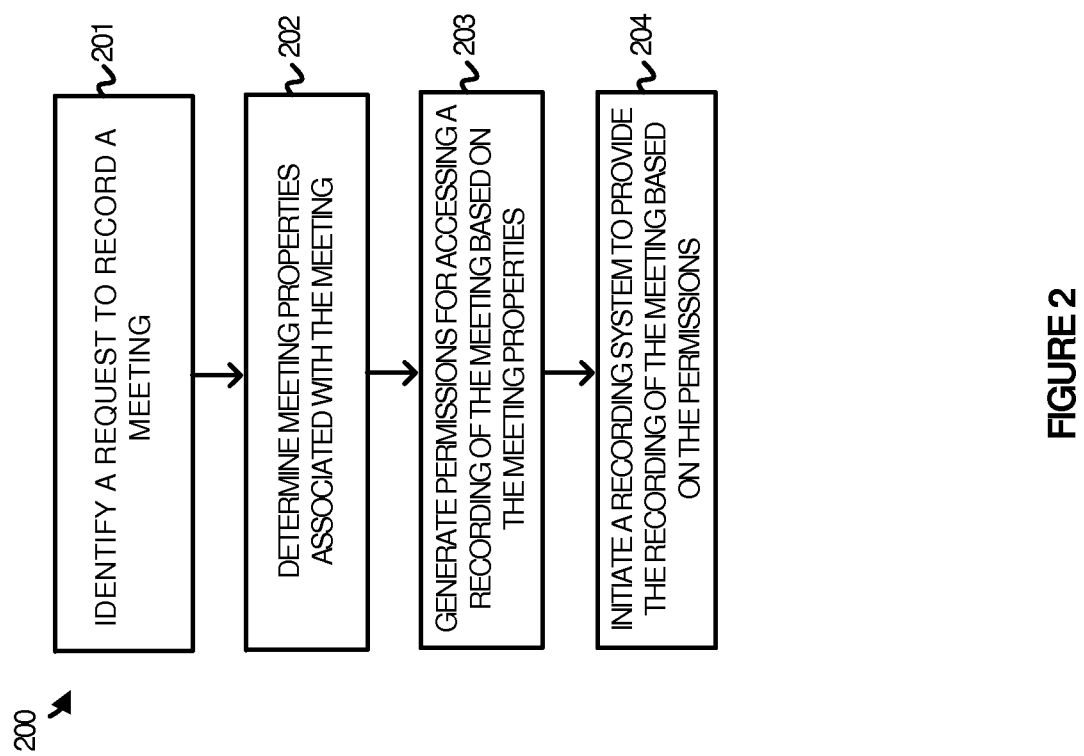
FIG. 2 illustrates a method of operating a meeting publishing system to manage meeting recording permissions based on properties associated with the meeting.

To further demonstrate the operation of meeting publishing system 114, FIG. 2 is provided. FIG. 2 illustrates a method 200 of operating a meeting publishing system to manage meeting recording permissions based on properties associated with the meeting. The operations of FIG. 2 are referenced parenthetically below.

In FIG. 2, meeting publishing system 114 identifies a request to record a meeting (201). In some examples, the request may be received from conferencing system 112 based on a scheduled meeting processed by conferencing system 112. For instance, a participant in the meeting may schedule and invite a plurality of other participants to the meeting via conferencing system 112. This meeting could be a meeting between remote participants on a plurality of end user devices, local participants in a meeting room, or some combination thereof. Once the scheduling is identified, conferencing system 112 may transfer a request to meeting publishing system 114 to initiate a recording of the meeting. In an alternative example, rather than identifying the request from conferencing system 112, meeting publishing system 114 may identify a pooling operation of existing communications, and identify a request to record the pooling communication. In further examples, the meeting may be initiated by recording system 116, or any of the other devices involved in the meeting. For example, a plurality of participants may initiate a voice communication using one or more end user devices, and provide input indicating a request to record the communication without the assistance of conferencing system 112.

In response to the request to record the meeting, meeting publishing system 114 determines meeting properties associated with the meeting (202). These meeting properties may include the invited participants to the meeting, the title or topic of the meeting, the attachments or files included in the invitation to the meeting, the attachments or files transferred during the course of the meeting, voice or text transcripts of conversations during the meeting, or any other similar meeting property. The meeting properties may be gathered from conferencing system 112, participant client devices within the meeting, an external database, or any other similar system or device.

Once the meeting properties are determined, meeting publishing system 114 may generate permissions for accessing a recording of the meeting based on the meeting properties (203). For example, a meeting organizer may invite a list of participants to take part in a meeting. Meeting publishing system 114 may identify this list of participants and correspondingly identify one or more workgroups that are associated with the list of participants. These workgroups may be assigned based on job title, based on a current project within the organization, or based on any other grouping means. Accordingly, if the list of participants is part of a safety board for an organization, any other member of the safety board may be provided permissions to access a recording of the particular meeting. Further, because the meeting might involve safety procedures, other personnel may also be provided access to the meeting based on their relation to the particular safety item discussed in the meeting.

In some examples, to determine the context of the meeting, meeting publishing system 114 may identify the topic of the meeting based on the topic provided in the meeting invite, but may also identify context based on analyzing the text, speech, or attachments from the meeting. For example, a participant in the meeting may make a document available to the other participants of the meeting. Meeting publishing system 114 may identify the contents of the document, and identify one or more other persons that should have access rights to the recording based on the contents. As illustrated in FIG. 1, the permissions granted by meeting publishing system 114 identify meeting group 120 with members 130-133 to have access to the meeting.

Once the permissions are identified based on the meeting properties, meeting publishing system 114 may initiate recording system 116 to provide the recording of the meeting based on the permissions (204). In at least one example, recording system 116 may be communicatively coupled to conferencing system 112, and use the meeting services provided by conferencing system 112 to generate the recording, which may include the voice, video, text, attachments, or any other recordable aspect of the meeting. In another example, recording system 116 may communicate directly with the participant client devices to gather the information necessary for the recording. For instance, in the example of a conference call, recording system 116 may communicate with one or more of the devices involved in the call to generate the meeting recording.

In some examples, based on the generated permissions, meeting publishing system 114 or recording system 116 may provide an email, text message, or some other type of notification to members of meeting group 120. These notifications may allow members of meeting group 120 to access the recording of the meeting via a hyperlink some other path to meeting recording. Further, the notification may also provide a username and password that allows the selected user to access the meeting recording.

In some examples, to generate the recording, an organization may include a database that stores a plurality of recorded meetings. This database may include a plurality of directories or logical categories associated with particular subject matter, workgroups, or other similar divisions. Accordingly, when determining the permissions for a particular meeting recording, meeting publishing system may identify an appropriate directory to store the meeting. Thus, when a user requires access to the meeting, the user may search the applicable directory related to the meeting. In some instances, each of the directories within the database may be assigned permissions. As a result, only users capable of accessing the particular directory may have access to the meeting recording. In some examples, as the recorded meetings are placed within the database, the meetings may be assigned "tags" or relationship identifiers that allow users to search for the particular meeting recording. These tags may be defined based on the subject of the meeting, the content of the meeting, the participants invited to the meeting, or some other similar property of the meeting. For example, if the subject of the meeting were "safety in the workplace," any search for the term safety may identify that particular meeting as a relevant result.

Returning to the elements of FIG. 1, conferencing system 112, meeting publishing system 114, and recording system 116 may each include communication interfaces, network interfaces, processing systems, computer systems, microprocessors, storage systems, storage media, or some other processing devices or software systems, and can be distributed among multiple devices. Conferencing system 112, meeting publishing system 114, and recording system 116 may comprise server computers, desktop computers, or other similar computing systems, including combinations and virtual representations thereof.

Although not illustrated in FIG. 1, it should be understood that recording system 116 may include a management system that manages the permissions for each of the recordings made available to the end users. This management system may make certain recordings, directories, tags, and categories available or visible to each of the users based on the permissions defined by meeting publishing system 114. Further, although illustrated separate in the present example, it should be understood that publishing system 114 may reside wholly or partially on the same device or system of devices that comprise recording system 116.

Members 130-133 may access the recording of the meeting using a variety of end user devices. These end user devices may each comprise a wireless phone, a computer, a tablet, a gaming system, or any other similar type of end user device. Each end user device may include communication interfaces, network interfaces, processing systems, computer systems, microprocessors, storage systems, storage media, or some other processing devices or software systems.

Network 110 may comprise switches, wireless access nodes, Internet routers, network gateways, application servers, computer systems, communication links, or some other type of communication equipment—including combinations thereof. This communication equipment is used to provide communication connectivity between conferencing system 112, meeting publishing system 114, recording system 116, and the end user devices used by members 130-133.

Communication links 150-153 each use metal, glass, optical, air, space, or some other material as the transport media. Communication links 180-186 may use Time Division Multiplex (TDM), asynchronous transfer mode (ATM), internet protocol (IP), Ethernet, synchronous optical networking (SONET), hybrid fiber-coax (HFC), circuit-switched, communication signaling, wireless communications, or some other communication format, including improvements thereof.

Figure 3:
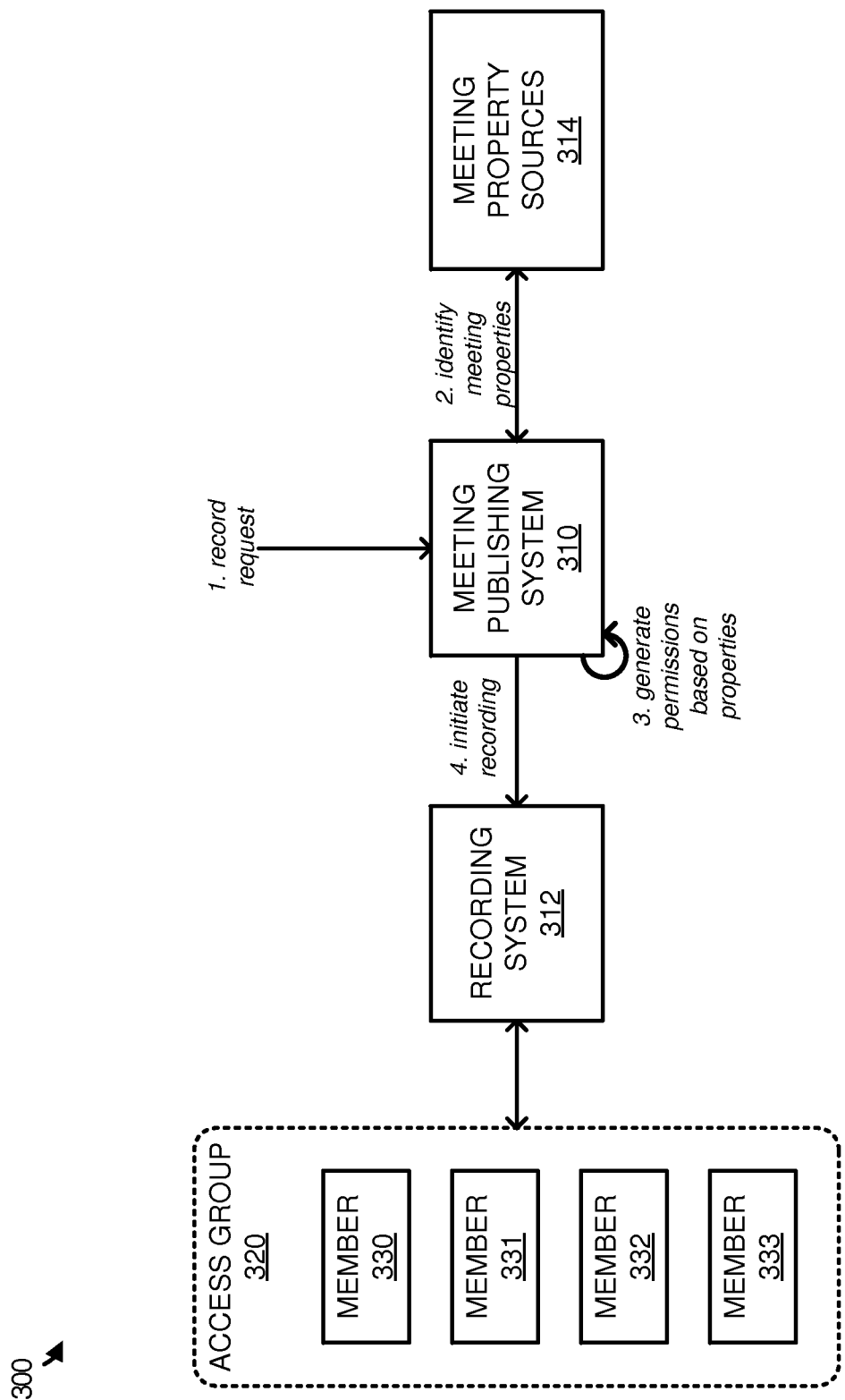
FIG. 3 illustrates an overview of providing meeting recording permissions based on properties associated with the meeting.

Referring now to FIG. 3, FIG. 3 illustrates an overview 300 of providing meeting recording permissions based on properties associated with the meeting. Overview 300 includes meeting publishing system 310, recording system 312, meeting property sources 314, and access group 320. Access group 320 includes members 330-333, which correspond to various persons with access permissions to a particular meeting recording.

As illustrated in FIG. 3, meeting publishing system 310 identifies a request to record a meeting. This request may be initiated by a conferencing system that acts as a centralized service to manage a meeting between a plurality of participants and one or more end devices, may be initiated by the recording system responsible for recording the meeting, or may be initiated based on request to record a communication between a pool of existing communication participants. In response to the record request, meeting publishing system identifies meeting properties from meeting property sources 314. Meeting property sources 314 may comprise the conferencing system that manages the communication between the participants, the client devices used by the participants in the meeting, a database associated with the participants in the meeting, or some other property source, including combinations thereof. The properties retrieved from meeting property source 314 may include information about the participants in the meeting, the topic and content of the meeting, or any other similar property associated with the meeting.

Once the meeting properties are identified, meeting publishing system 310 generates permissions based on the gathered properties. For example, a meeting may occur between participants that are a portion of a larger workgroup. Accordingly, to allow other members of the workgroup to have access to the meeting, meeting publishing system 310 may generate permissions that allow all users in the workgroup to have access to the meeting. Conversely, if the meeting is between members of human resources of an organization, it may be improper to have anyone outside of the invited participants to have access to the contents of the meeting. Thus, meeting publishing system 310 may generate permissions that only allow access to the recording for the participants that were invited to the original meeting.

After the meeting permissions are generated, meeting publishing system may initiate the recording of the meeting via recording system 312. As illustrated in the present example, the permissions granted by meeting publishing system 310 allow access group 320 and members 330-333 to access the recording. Members 330-333 may include the participants invited to the meeting, as well as one or more other persons related to the meeting. In some examples, to access the meeting, recording system 312 may be configured to store the meeting within a database comprising a plurality of meetings and directories. These directories may each be accessible by a plurality of members based on their position, relation, or workgroup within a particular organization. Thus, the meeting recording may be placed in one or more of the directories to allow the necessary persons access to the particular meeting recording.

Figure 4:
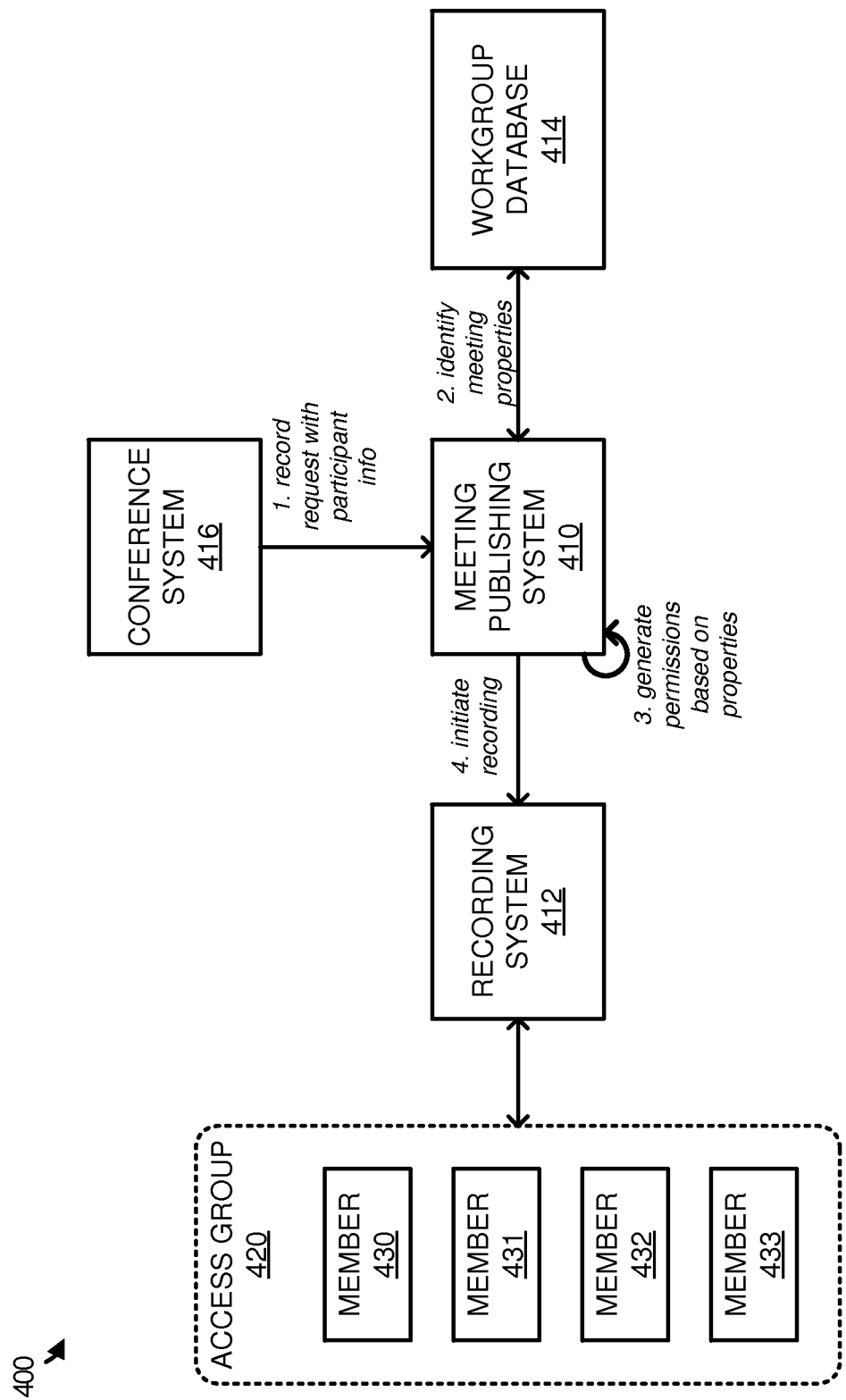
FIG. 4 illustrates an overview of providing meeting recording permissions based on properties associated with the meeting.

FIG. 4 illustrates an overview 400 of providing meeting recording permissions based on properties associated with the meeting according to a particular example. Overview 400 includes meeting publishing system 410, recording system 412, workgroup database 414, conference system 416, and access group 420. Access group 420 includes members 430-433, which correspond to various persons with access permissions to a particular meeting recording.

As illustrated in FIG. 4, conference system 416 generates and transfers a meeting record request to meeting publishing system 410. This request may be generated by a participant in the meeting, by a preconfigured setting that requires a recording of the meeting, or by any other request generating means. Here, in addition to the request, meeting publishing system 410 also receives a participant list corresponding to the participants invited to participate in the original meeting. Once received, meeting publishing system 410 may query workgroup database 414 to determine if additional members should be given permission to access the meeting recording. For example, an administrator may predefine groups of one or more users that often require access to the same information. Accordingly, when a meeting is identified with participants from a particular workgroup, other members within the same workgroup may be identified to receive access to the recording of the meeting.

Once the permissions are identified via workgroup database 414, meeting publishing system 410 may initiate the recording of the meeting using recording system 412. Although not illustrated in the present example, it should be understood that recording system 412 might communicate with conference system 416 to generate the recording. For instance, conference system 416 may act as a centralized server to facilitate the communications between the participants of the meeting. Thus, rather than communicating directly with the end user devices, recording system 412 may gather the recording data, such as voice and video data, from conference system 416. Once the recording is initiated, members 430-433 in access group 420 may access the recording of the meeting. Although four members are illustrated in the present example, it should be understood that meeting publishing system 410 might grant permission to access the recording to any number of members.

Although not illustrated in FIG. 4, it should be understood that recording system 412 may include a management system that manages the permissions for each of the recordings made available to the end users. This management system may make certain recordings, directories, tags, and categories available or visible to each of the users based on the permissions defined by meeting publishing system 410. For example, when member 430 attempts access the meeting recording, the management system may be provide the functionality to provide the user with the recording via the appropriate directory, tag, category, or other resource. In contrast, if a user outside of access group 420 attempts to access the same meeting recording, the user outside of the access group may be prevented from accessing the recording. This prevention may be accomplished by preventing the outside user from accessing the same directories and categories, preventing the user from selecting the recording, preventing the user from accessing a tag associated with the recording, or any other similar method of preventing the outside user access to the meeting recording.

Figure 5:
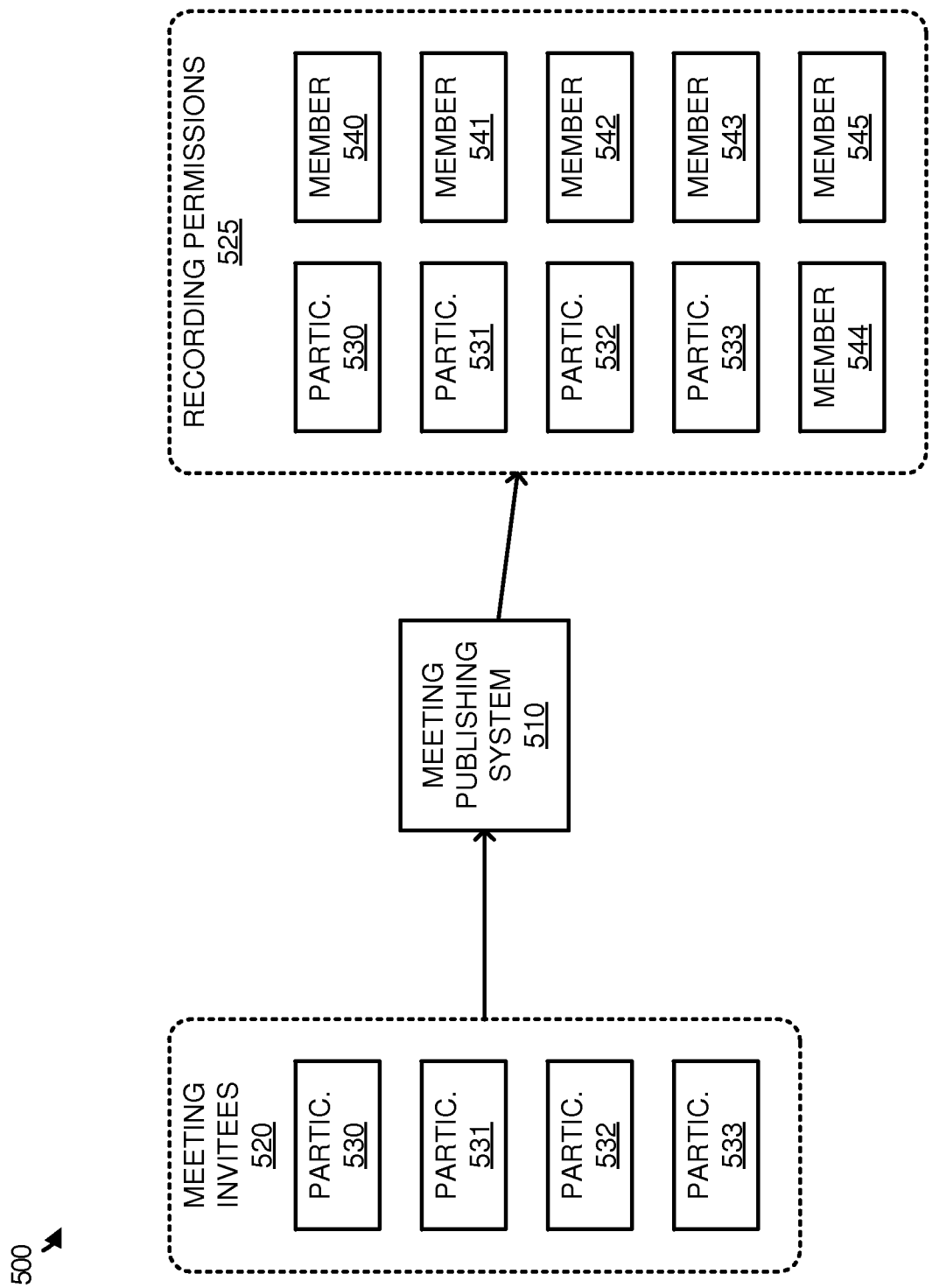
FIG. 5 illustrates a flow diagram of generating meeting recording permissions based on meeting properties.

To further illustrate the assignment of permissions, FIG. 5 is provided. FIG. 5 illustrates a flow diagram 500 of generating meeting recording permissions based on meeting properties. Flow diagram 500 includes meeting invitees 520, meeting publishing system 510, and recording permissions 525. As described herein, meeting publishing system 510 may be configured, upon a recording request, to identify permissions for accessing a recording of a particular meeting.

In the present example, meeting publishing system 510 receives a request to record a meeting with meeting invitees 520, which includes participants 530-533. In response to the request, meeting publishing system 510 identifies a plurality of properties for the meeting, which may include identifiers for the participants in the meeting, the subject of the meeting, the content of the meeting, any attachments made before or during the meeting, or any other similar information, including combinations thereof. Once the meeting properties are identified, meeting publishing system generates recording permissions 525 corresponding to persons permitted to access the recording of the meeting. Here, meeting publishing system 510 permits participants 530-533 from meeting invites 520, and also includes members 540-545 to access the recording of the meeting.

The identification of members outside of the original meeting invitees may be based on the relationship between the members and the properties associated with the particular meeting. This relationship may be based on the subject of the meeting, workgroups associated with the participants of the meeting, or context derived from the meeting communications. For example, a meeting may have a topic of "safety on an assembly line." As a result of this topic, any persons within the organization associated with "safety" or the "assembly line" may be provided access to the meeting recording, even if they were not included in the original meeting invite.

In some examples, the permissions for a new recording may be based on permissions from a previous recording. For instance, if a first meeting recording granted permissions to a particular group of users, the publishing system may identify similar characteristics between the first meeting and the new meeting to determine access permissions for the new meeting. These characteristics may include the invitees to the meeting, the topic of the meeting, the location of the meeting, or some other similar characteristic, including combinations thereof. This may be useful for recurring meetings, wherein the permissions may be duplicated for each of the recurring meetings.

Referring now to FIG. 6, FIG. 6 illustrates a data structure 600 for determining recording permissions based on meeting properties. Data structure 600 includes meeting properties 610 and members 620-623. Although illustrated in the present example as a table, it should be understood that data structure 600 might comprise a linked list, an array, a data tree, or some other type of data structure.

As described herein, meeting publishing systems are configured to identify a request to record a meeting, and identify properties associated with the particular meeting. Once the properties are identified, the meeting publishing system may generate permissions for one or more persons to access the recording of the meeting based on the meeting properties. In the present example, to determine the permissions for the meeting, data structure 600 is provided. Data structure 600 is used to associate a meeting property with one or more members. Meeting properties 610 may comprise workgroup identifiers based on participants invited to the meeting, topics or titles of the meeting, contents of the meeting, or any other similar property related to the meeting, including combinations thereof. For example, property 612 may be identified in association with a meeting. Responsive to identifying property 612, members associated with property 612, which may reference groups in an organization, may be assigned permissions, allowing the member to have access to the recording of the meeting. This access may allow the members to view a video stream of the meeting, listen to audio of the meeting, access documents and files attached to the meeting, or any combination thereof.

In some examples, although data structure 600 may be used to identify the permissions associated with the meeting, it should be understood that an administrator or the meeting organizer might verify the permissions before the recording meeting is made available. Thus, the administrator or organizer may remove or add persons to the list of users identified by the meeting publishing system.

Despite not being illustrated in data structure 600, it should also be understood that a data structure might be used to identify directories where the meeting recording should be accessible, or any other categories or tags that can be used to identify and locate the recording. As a result, rather than identifying individual members associated with a meeting property, directories may be identified that are accessible by one or more end users.

Figure 7:
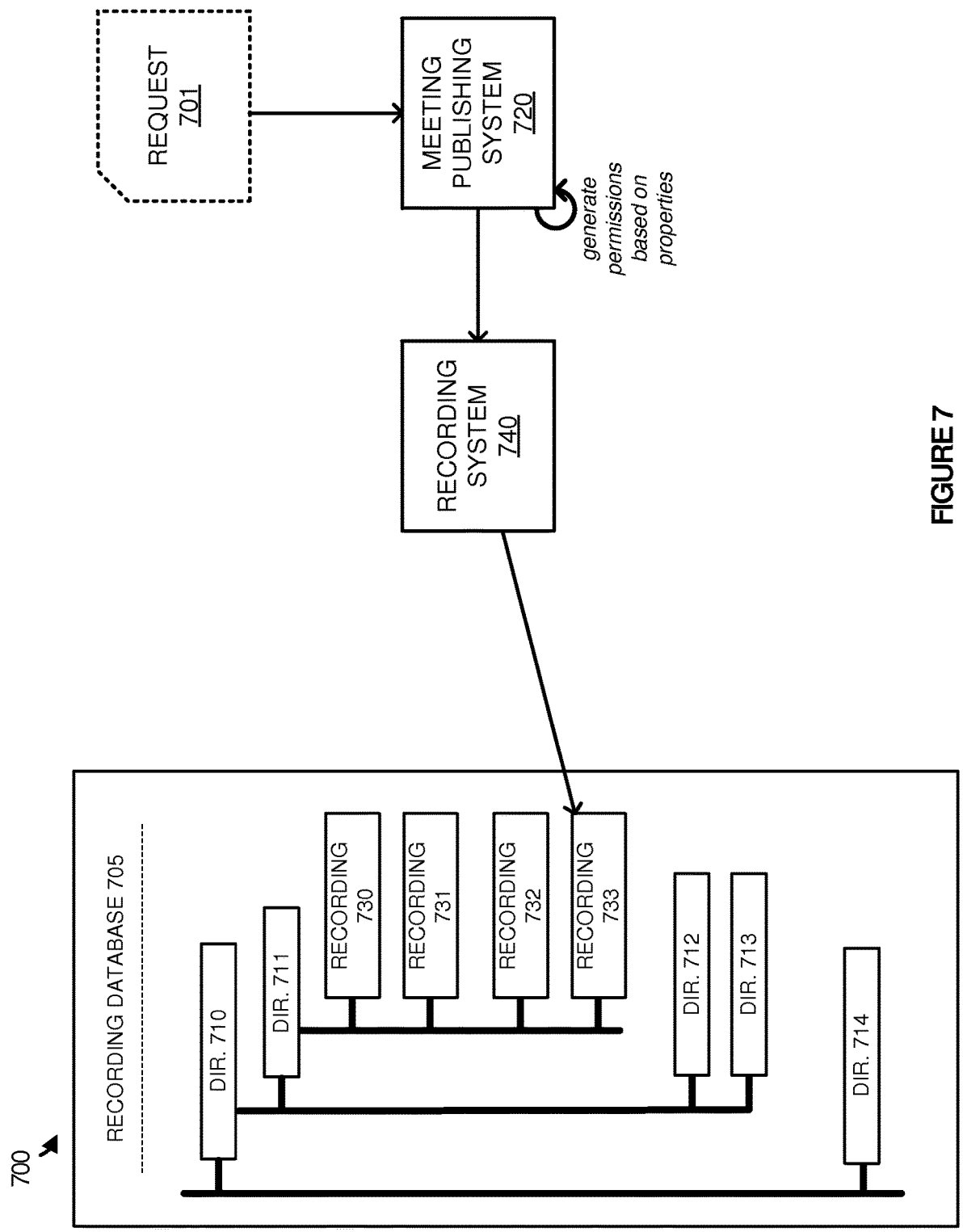
FIG. 7 illustrates an operational scenario of generating a meeting recording and storing the meeting recording within a database.

Referring to FIG. 7, FIG. 7 illustrates an operational scenario 700 of generating a meeting recording and storing the meeting recording within a database according to one example. Operational scenario 700 includes recording database 705, meeting publishing system 720, and recording system 740. Recording database 705 includes directories 710-714 and recordings 730-733.

In operation, request 701 is transferred to meeting publishing system 720 via a conferencing system of end client device. In response to receiving request 701, meeting publishing system 720 identifies permissions for the meeting recording based on properties associated with the meeting. Once the permissions are generated, recording system 740 initiates recording of the meeting and stores the meeting within recording database 705. In the present example, the process of generating permissions includes identifying a title of the meeting and one or more corresponding directories to allow users to access the recorded version of the meeting. Here, meeting publishing system 720 identifies directory 711 to be the accessible location of recording 733 associated with request 701. Accordingly, any user with access rights to directory 711 may access the recording. Further, although not illustrated in FIG. 7, it should be understood that each recording in recordings 730-733 might include characteristics, such as time of the meeting, title of the meeting, invitees to the meeting, or any other relevant characteristics that could be derived from the meeting properties.

In some examples, in place of or in addition to providing the recording in a recording database, a link to the meeting may be transferred to members approved to access the recorded meeting. This link may be transferred in an email, text message, or some other messaging format that allows the member to select the link and access the recording in the recording database. In some examples, the recording system may include or be communicatively coupled to a content management system, which may be used to hide complexities of large amounts of recorded data. This management system may prevent or allow access to each of the recordings based on the identity of the user attempting to access the recording system.

Figure 8:
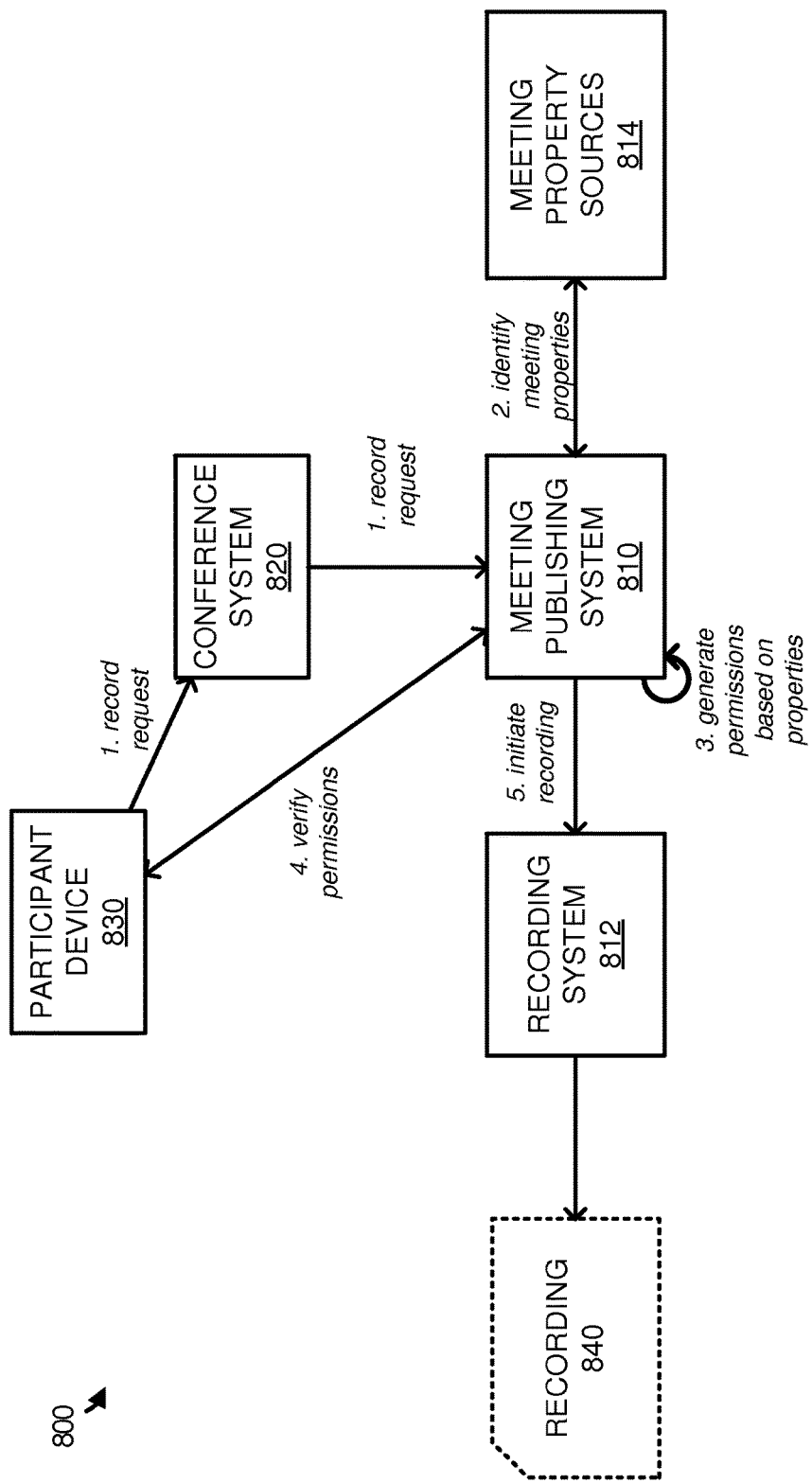
FIG. 8 illustrates an operational scenario of generating permissions for a meeting recording and verifying the permissions via a meeting participant.

FIG. 8 illustrates an operational scenario 800 of generating permissions for a meeting recording and verifying the permissions via a meeting participant. Operational scenario 800 includes meeting publishing system 810, recording system 812, meeting property sources 814, conference system 820, and participant device 830. In operation, participant device 830 initiates a request to record a meeting for a plurality of participants. In response to the request, conference system 820 forwards the request to meeting publishing system 810. Meeting publishing system 810 identifies properties associated with the meeting using meeting property sources 814, and generates permissions for the meeting recording based on the meeting properties. Although illustrated as a separate entity, it should be understood that meeting property sources 814 might comprise conference system 820 as well as client devices used in the meeting.

Here, upon determining the permissions based on the information about the meeting, meeting publishing system 810 may verify the permissions via a user at participant device 830. For example, meeting publishing system 810 may identify a title for the meeting recording and a list of persons that should have access to the recording. Meeting publishing system 810 may then provide an interface to the user of participant device 830 allowing the user add or remove users from the list, or change other permission related aspects to the meeting recording. Once approved by the user, meeting publishing system 810 may initiate recording system 812 to generate recording 840. Although not illustrated in the present example, it should be understood that recording system 812 might be in communication with conference system 820. This would allow recording system 812 to receive the media output generated by each of the participants involved in the meeting.

Although not illustrated in FIG. 8, it should be understood that recording system 812 may include a management system that manages the permissions for each of the recordings made available to the end users. This management system may make certain recordings, directories, tags, and categories available or visible to each of the users based on the permissions defined by meeting publishing system 810.

Although described herein in FIG. 1-8 as generating access permissions for an entire meeting, it should be understood that in some examples similar processes might be used to provide access permissions to specific segments of a larger meeting. For example, if a meeting covered a variety of topics, permissions may be granted to users on an individual topic basis, preventing the users from accessing segments of the meeting that were either irrelevant or inappropriate for the user to access. These segment determinations may be defined based on text or audio transcript content for the meeting at particular times, a schedule provided by the meeting organizer, or some other section determination basis.

Figure 9:
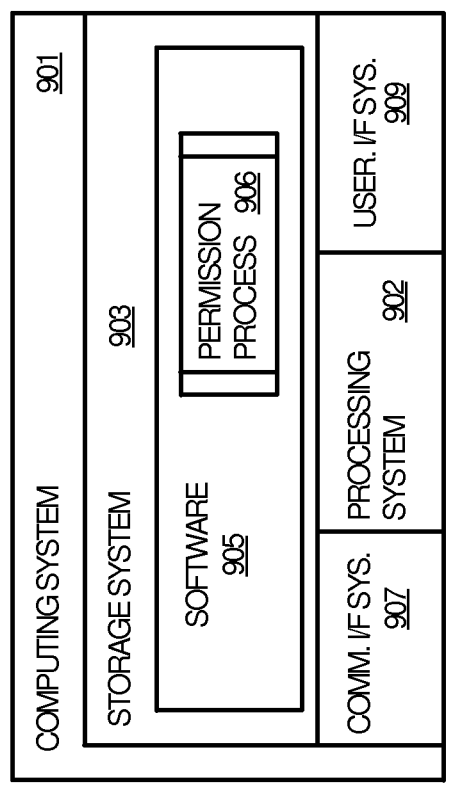
FIG. 9 illustrates a computing system that is representative of a meeting publishing system.

Referring to FIG. 9, FIG. 9 illustrates a computing system 901 that is representative of any computing system or systems capable of implementing the architectures, processes, scenarios, and sequences disclosed herein for meeting publishing systems 114, 310, 410, 510, 720, and 810. Examples of computing system 901 include, but are not limited to, server computers, web servers, application servers, rack servers, blade servers, virtual servers, desktop computers, work stations, laptop computers, tablet computers, smart phones, hybrid computers, gaming machines, virtual machines, smart televisions, and watches and other wearable devices, as well as any variation or combination thereof. In some implementations, a collection of multiple computing systems may be employed to implement all or portions of an application or service which may be hosted in one or more data centers, virtual data centers, or any other suitable computing facilities.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. When executed by processing system 902 to provide meeting publishing permissions, software 905 directs processing system 902 to operate as described herein for the various processes, operational scenarios, and sequences discussed in the foregoing implementations. Computing system 901 may optionally include additional devices, features, or functionality not discussed for purposes of brevity.

Referring still to FIG. 9, processing system 902 may comprise a microprocessor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general-purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 includes permission process 906, which is representative of the process necessary to accomplish the method described in FIG. 2 and the other recording permission processes described herein in FIGS. 1-8. Software 905 in general, and permission process 906 in particular, may be implemented in program instructions that among other functions may, when executed by processing system 902, direct processing system 902 to operate as described with respect to the various operational scenarios, sequences, and processes illustrated herein.

The program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate the generation of meeting access permissions based on properties associated with the meeting. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In an example operation of computing system 901, permission process 906 directs processing system 902 to identify, via communication interface system 907, a request to record a meeting for a plurality of participants. In response to the request, permission process 906 directs processing system 902 to determine meeting properties associated with the meeting, and generate permissions for accessing a recording of the meeting based on the meeting properties. Once the permissions are identified, permission process 906 may initiate a recording system to provide the recording of the meeting based on the permissions.

It may be understood that computing system 901 is generally intended to represent a computing system or systems on which software 905 may be deployed and executed in order to implement permission process 906. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems, such as a conferencing system or recording system, over a communication network. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and any other computing system, such as a conferencing system or recording system, may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer readable storage medium having instructions stored thereon that, when executed by a meeting publishing system, direct the meeting publishing system to perform a method of generating meeting recording access permissions, the method comprising:
   identifying a request to record a meeting between a plurality of participants;
   in response to identifying the request, determining meeting properties associated with the meeting, wherein the meeting properties include a meeting subject associated with the meeting and a list of participants invited to the meeting;
   generating permissions for accessing a recording of the meeting based on the meeting properties, wherein the permissions include access permissions for one or more persons to access the recording, wherein the one or more persons were not invited to the meeting based on the list of participants invited to the meeting and are associated with a workgroup within an organization that is also associated with the plurality of participants;
   receiving, over a communication network, media output generated by the plurality of participants via respective communication devices;
   generating the recording of the meeting by storing the media output in a database of a storage system;
   after generating the recording of the meeting, receiving a request for the recording of the meeting from a communication device; and
   providing the communication device with access to the recording of the meeting in the database upon verifying the identity of a user of the communication device and determining that the user is one of the one or more persons from the permissions.

2. The computer readable storage medium of claim 1, further comprising:
   identifying a current project associated with the plurality of participants;
   associating the plurality of participants with the workgroup based on the current project; and
   identifying that the current project is also associated with the one or more persons; and
   associating the one or more persons with the workgroup.

3. The computer readable storage medium of claim 1, wherein the permissions further include access permissions for anyone associated with the workgroup to access the recording.

4. The computer readable storage medium of claim 3, wherein:
   generating the permissions comprises determining that the media output should be stored in a directory of the database associated with the workgroup, wherein anyone associated with the workgroup has permission to access data stored therein; and generating the recording of the meeting comprises storing the media output in the directory.

5. The computer readable storage medium of claim 1, wherein determining the meeting properties associated with the meeting comprises identifying content information from the meeting, the content information comprising at least one of file attachments to the meeting, instant messaging text transcripts for the meeting, or voice dictation transcripts for the meeting.

6. The computer readable storage medium of claim 1, wherein identifying the request to record the meeting between the plurality of participants comprises receiving the request to record the meeting between the plurality of participants from a conferencing system.

7. The computer readable storage medium of claim 1, wherein generating the permissions for accessing the recording of the meeting based on the meeting properties comprises identifying tags and directories for the meeting based on the meeting properties.

8. A method of operating a meeting publishing system to generate meeting publishing permissions, the method comprising:
identifying a request to record a meeting between a plurality of participants;
in response to identifying the request, determining meeting properties associated with the meeting, wherein the meeting properties include a meeting subject associated with the meeting and a list of participants invited to the meeting;
generating permissions for accessing a recording of the meeting based on the meeting properties, wherein the permissions include access permissions for one or more persons to access the recording, wherein the one or more persons were not invited to the meeting based on the list of participants invited to the meeting and are associated with a workgroup within an organization that is also associated with the plurality of participants;
receiving, over a communication network, media output generated by the plurality of participants via respective communication devices;
generating the recording of the meeting by storing the media output in a database of a storage system;
after generating the recording of the meeting, receiving a request for the recording of the meeting from a communication device; and
providing the communication device with access to the recording of the meeting in the database upon verifying the identity of a user of the communication device and determining that the user is one of the one or more persons from the permissions.

9. The method of claim 8, further comprising:
identifying a current project associated with the plurality of participants;
associating the plurality of participants with the workgroup based on the current project; and
identifying that the current project is also associated with the one or more persons; and
associating the one or more persons with the workgroup.

10. The method of claim 8, wherein the permissions further include access permissions for anyone associated with the workgroup to access the recording.

11. The method of claim 10, wherein:
generating the permissions comprises determining that the media output should be stored in a directory of the database associated with the workgroup, wherein anyone associated with the workgroup has permission to access data stored therein; and
generating the recording of the meeting comprises storing the media output in the directory.

12. The method of claim 8, wherein determining the meeting properties associated with the meeting comprises identifying content information for the meeting, the content information comprising at least one of file attachments to the meeting, instant messaging text transcripts for the meeting, or voice dictation transcripts for the meeting.

13. The method of claim 8, wherein identifying the request to record the meeting between the plurality of participants comprises receiving the request to record the meeting between the plurality of participants from a conferencing system.

14. The method of claim 8, wherein generating the permissions for accessing the recording of the meeting based on the meeting properties comprises identifying tags and directories for the meeting based on the meeting properties.

15. A meeting publishing system to generate meeting publishing permissions, the meeting publishing system comprising:
a communication interface configured to receive a request to record a meeting between a plurality of participants;
a processing system configured to execute processing instructions that direct the processing system to:
in response to receiving the request, determine meeting properties associated with the meeting, wherein the meeting properties include a meeting subject associated with the meeting and a list of participants invited to the meeting;
generate permissions for accessing a recording of the meeting based on the meeting properties, wherein the permissions include access permissions for one or more persons to access the recording, wherein the one or more persons were not invited to the meeting based on the list of participants invited to the meeting and are associated with a workgroup within an organization that is also associated with the plurality of participants;
receive, over a communication network, media output generated by the plurality of participants via respective communication devices;
generate the recording of the meeting by storing the media output in a database of a storage system;
after generating the recording of the meeting, receive a request for the recording of the meeting from a communication device; and
provide the communication device with access to the recording of the meeting in the database upon verifying the identity of a user of the communication device and determining that the user is one of the one or more persons from the permissions.

16. The meeting publishing system of claim 15, wherein the communication interface configured to receive the request to record the meeting between the plurality of participants is configured to receive the request to record the meeting between the plurality of participants from a conferencing system.

17. The meeting publishing system of claim 15, wherein the meeting properties comprise at least one of identifiers for the plurality of participants, a subject for the meeting, a transcript of voice communications from the meeting, or one or more file attachments to the meeting.

18. The meeting publishing system of claim 15, wherein the processing instructions further direct the processing system to:

identify a current project associated with the plurality of participants;
associate the plurality of participants with the workgroup based on the current project;
identify that the current project is also associated with the one or more persons; and
associate the one or more persons with the workgroup.

* * * * *